(12) United States Patent
Lee et al.

(10) Patent No.: US 8,174,825 B2
(45) Date of Patent: May 8, 2012

(54) APPARATUS AND METHODS FOR MANAGING CONNECTION CABLES OF PORTABLE OPTICAL DRIVES

(75) Inventors: Kah Soon Lee, Perak (MY); Kian Hui Hong, Singapore (SG)

(73) Assignee: Dell Products, L.P., Round Rock, TX (US)

( * ) Notice: Subject to any disclaimer, the term of this patent is extended or adjusted under 35 U.S.C. 154(b) by 308 days.

(21) Appl. No.: 12/589,838

(22) Filed: Oct. 29, 2009

(65) Prior Publication Data

US 2011/0107359 A1    May 5, 2011

(51) Int. Cl.
*G06F 1/16*    (2006.01)
*H05K 5/00*    (2006.01)
*H05K 7/00*    (2006.01)

(52) U.S. Cl. .......... 361/679.37; 361/679.31; 361/679.33

(58) Field of Classification Search ... 361/679.33–679.4
See application file for complete search history.

(56) References Cited

U.S. PATENT DOCUMENTS

| | | | |
|---|---|---|---|
| 6,070,742 A * | 6/2000 | McAnally et al. | 211/26 |
| 6,267,608 B1 | 7/2001 | Yagi | |
| 6,315,231 B1 * | 11/2001 | Liaom | 242/378.1 |
| 6,374,970 B1 * | 4/2002 | Liao | 191/12.4 |
| 6,378,797 B1 * | 4/2002 | Liao | 242/378.1 |
| 6,392,884 B1 * | 5/2002 | Chou | 361/679.33 |
| 6,483,033 B1 | 11/2002 | Simoes et al. | |
| 6,488,542 B2 * | 12/2002 | Laity | 439/676 |
| 6,616,080 B1 * | 9/2003 | Edwards et al. | 242/378.1 |
| 6,621,693 B1 * | 9/2003 | Potter et al. | 361/679.33 |
| 6,626,389 B2 * | 9/2003 | Kagel | 242/379 |
| 6,731,956 B2 | 5/2004 | Hanna et al. | |
| 6,839,237 B2 * | 1/2005 | Fite et al. | 361/727 |
| 6,944,011 B2 * | 9/2005 | Krajecki | 361/679.01 |
| D513,750 S | 1/2006 | Ko et al. | |
| D517,065 S | 3/2006 | Ko et al. | |
| 7,159,700 B2 * | 1/2007 | Liao | 191/12.4 |
| 7,273,192 B2 * | 9/2007 | Park | 242/385.2 |
| 7,857,659 B2 * | 12/2010 | Wang et al. | 439/501 |
| 7,959,459 B2 * | 6/2011 | Mundt | 439/501 |
| 2003/0114040 A1 * | 6/2003 | Homer | 439/418 |
| 2003/0165237 A1 * | 9/2003 | Farr et al. | 379/430 |
| 2005/0170686 A1 * | 8/2005 | Thorland et al. | 439/501 |

(Continued)

OTHER PUBLICATIONS

Szleper et al., "SFF-8552 Specification for Form Factor of 5 ¼" 9.5mm and 12.7mm Height Optical Drives, Rev. 1.3, Jan. 18, 2009, 36 pgs.

*Primary Examiner* — Adrian S Wilson
(74) *Attorney, Agent, or Firm* — O'Keefe, Egan, Peterman & Enders LLP (57) ABSTRACT

Apparatus and methods for managing a connection cable that is used for interconnecting a small form factor (SFF) portable optical disk drive (ODD) or other similarly configured ODD to an information handling system such as notebook or desktop computer. A retractable fixed connection cable may be provided inside an internal cavity within the external enclosure of a portable ODD apparatus that has an inner chassis with a disk receiving section that is configured to receive an optical disk media and that extends beyond the outer boundary of an electronics section of the inner chassis of an ODD that contains electronic components so as to form a cut-out section that defines the internal cavity between the inner ODD chassis and the inside of an outer ODD enclosure when these components are assembled together.

24 Claims, 12 Drawing Sheets

U.S. PATENT DOCUMENTS

| | | |
|---|---|---|
| 2006/0027697 A1 | 2/2006 | Gojanovic et al. |
| 2006/0262578 A1 | 11/2006 | Farrar et al. |
| 2007/0017883 A1* | 1/2007 | Bridges et al. ............. 211/26 |
| 2007/0233781 A1* | 10/2007 | Starr et al. ............... 709/203 |
| 2007/0258204 A1* | 11/2007 | Chang et al. ............. 361/683 |
| 2007/0279875 A1* | 12/2007 | Bell et al. ................. 361/747 |
| 2010/0197165 A1* | 8/2010 | Mundt ....................... 439/501 |

\* cited by examiner

APPARATUS AND METHODS FOR MANAGING CONNECTION CABLES OF PORTABLE OPTICAL DRIVES

FIELD OF THE INVENTION

This invention relates generally to information handling systems, and more particularly to managing connection cables for portable optical drive devices that connect to information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

External portable optical disk drives (ODD) are available for interfacing with information handling systems using a connection cable that is used to removeably and temporarily connect the host information handling system to the portable drive (e.g., via universal serial bus "USB" or external serial ATA "eSATA" interfaces). Some of such external optical drives ship to an end user or customer with a detachable and removable connection cable as part of the accessories for the drive. In other cases, such drives are provided with a fixed (i.e., non-detachable) and externally located connection cable attached to and hanging from the enclosure of the ODD. The detachable connection cable option may require that the end user carry the cable in a separate and different storage package from the drive, and there is a risk that the end customer will lose the cable. For the fixed cable option, the end customer may experience difficulty keeping the connection cable within the storage package for the portable optical drive.

Figure 1:
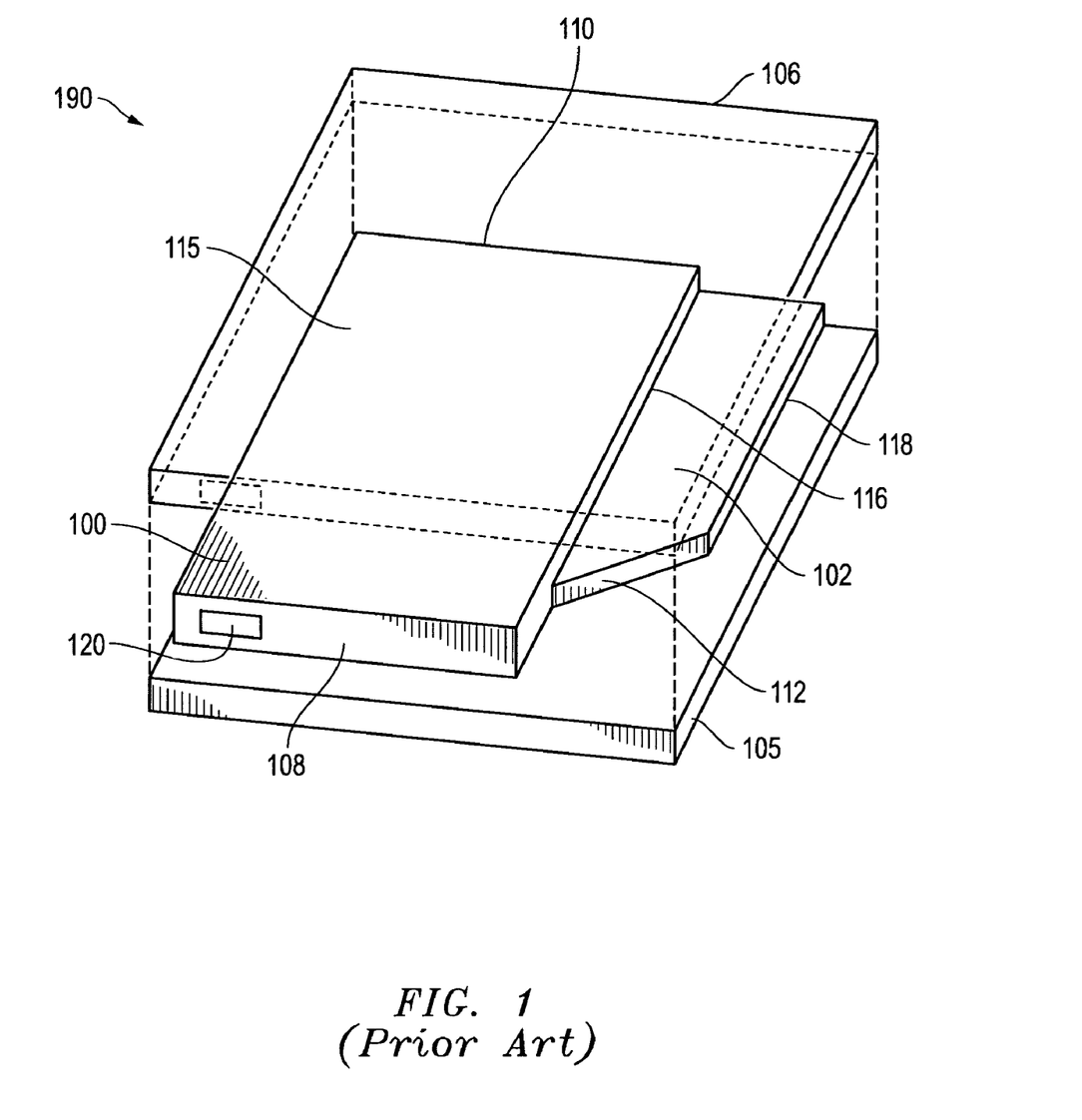
FIG. 1 is an exploded underside view of a prior art portable ODD.

FIG. 1 illustrates an exploded underside view of a prior art portable ODD 190 having an inner chassis 100 that meets the Small Form Factor Committee "SFF-8552 Specification for Form Factor of 5¼", 9.5 mm and 12.7 mm Height Optical Drives." Portable ODD inner chassis 100 includes a electronics section 116 that contains electronic components (including motor) of the drive and an disk receiving section 118 that includes a bay configured for receiving outer dimensions of an optical disk. As shown, disk receiving section 118 extends outward from and beyond the outer periphery of electronics section 116 so as to form a cut-out section 102 of reduced thickness in the underside 115 of inner chassis 100. The outwardly-extending portion of disk receiving section 118 extends backwards from front surface 110 of inner chassis as shown toward back surface 108 of inner chassis structure 100, and terminates with a backwardly angled profile section 112 as shown. The inner chassis 100 of ODD 190 is configured to be received between lower drive enclosure component 106 and upper drive enclosure component 105 that are placed to surround the inner chassis 100 during normal drive operations. When so assembled, an empty space is formed between the inside of lower drive enclosure component 106 and the cut-out section 102. As shown, a connector port 120 is provided in back surface 108 of the inner chassis 100 for insertion of a detachable connection cable for interconnection with an information handling system.

SUMMARY OF THE INVENTION

Disclosed herein are apparatus and methods for managing (e.g., using, retaining and storing) connection cables (e.g., USB cable, eSATA cable, etc.) that are used for interconnecting a small form factor (SFF) portable optical disk drive (ODD) or other similarly configured ODD to an information handling system. Such connection cables may be configured for communicating data between the ODD and an information handling system, and optionally for providing power to the ODD from the information handling system. Using the disclosed apparatus and methods, a retractable fixed connection cable (i.e., a cable fixedly attached and non-detachable from the ODD) may be provided inside an external enclosure of an ODD to simultaneously reduce the risk of losing the connection cable while eliminating the concerns for managing a fixed connection cable that hangs outside the portable optical disk drive during storage. The disclosed apparatus and methods may be advantageously implemented in one embodiment without the presence of any coiling or cable retrieval mechanism. Examples of types of ODD apparatus with which the disclosed apparatus and methods may be employed, include, but are not limited to, CD-ROM, CD-RW, DVD-ROM, Combo (DVD-ROM+CD-RW), DVD+/−RW, Blu-Ray BD-ROM, Blu-Ray-Combo (BD-ROM+DVD+/−RW), Blu-Ray BD-RE, etc.

The disclosed apparatus and methods may be implemented with any portable ODD apparatus with an inner chassis having a disk receiving section that is configured to receive the optical disk media and that extends beyond the outer boundary of (i.e., overhangs or is cantilevered relative to) an electronics section of the inner chassis that contains electronic components (e.g., such as ODD drive motor) so as to form a cut-out section that defines an internal cavity between the inner ODD chassis and the inside of an outer ODD enclosure when these components are assembled together. Examples of such ODD apparatus include, but are not limited to, 12.7 mm, 9.5 mm, 5¼ inch, and 7 mm bare ODD apparatus. One example of such an ODD is a drive configured according to the Small Form Factor Committee "SFF-8552 Specification for Form Factor of 5¼", 9.5 mm and 12.7 mm Height Optical Drives." Advantageously, the disclosed apparatus and methods may be implemented for retaining and storing the connection cable of an ODD apparatus without requiring the provision of any additional ODD enclosure volume and/or change in outer enclosure or inner chassis configuration as compared to a conventional SFF-8552 compliant ODD, and without increasing the overall outer dimensions of the ODD apparatus, i.e., the disclosed portable ODD may have external dimensions that are identical to the external dimensions of a conventional SFF-8552 compliant ODD.

In one respect, disclosed herein is a portable optical disk drive (ODD) apparatus, including: an inner chassis having a disk receiving section configured to receive an optical disk media and an electronics section containing electronic components, the disk receiving section extending beyond the outer boundary of the electronics section to form a cut-out section; at least one outer enclosure component coupled to at least partially surround the inner chassis such that an internal cavity is defined between the inner chassis and the inside of the outer enclosure component; and a connection cable having terminal and proximal ends, the proximal end of the connection cable being electrically coupled within the internal cavity to one or more electronic components of the inner chassis. A cable access opening may be defined in the outer enclosure component contiguous with the internal cavity, and the connection cable may be selectably positionable between a retracted position where the connection cable is substantially contained within the internal cavity and an extended position where the connection cable is at least partially extended from the cavity through the cable access opening to a position outside the outer enclosure component.

In another respect, disclosed herein is a method of managing a connection cable of a portable optical disk drive (ODD) apparatus. The may include providing a portable ODD apparatus that includes: an inner chassis having a disk receiving section configured to receive an optical disk media and an electronics section containing electronic components, the disk receiving section extending beyond the outer boundary of the electronics section to form a cut-out section, at least one outer enclosure component coupled to at least partially surround the inner chassis such that an internal cavity is defined between the inner chassis and the inside of the outer enclosure component, and a connection cable having terminal and proximal ends, the proximal end of the connection cable being electrically coupled within the internal cavity to one or more electronic components of the inner chassis, with a cable access opening being defined in the outer enclosure component contiguous with the internal cavity. The method may also include selectably positioning the connection cable between a retracted position where the connection cable is substantially contained within the internal cavity and an extended position where the connection cable is at least partially extended from the cavity through the cable access opening to a position outside the outer enclosure component.

DESCRIPTION OF ILLUSTRATIVE EMBODIMENTS

Figure 2:
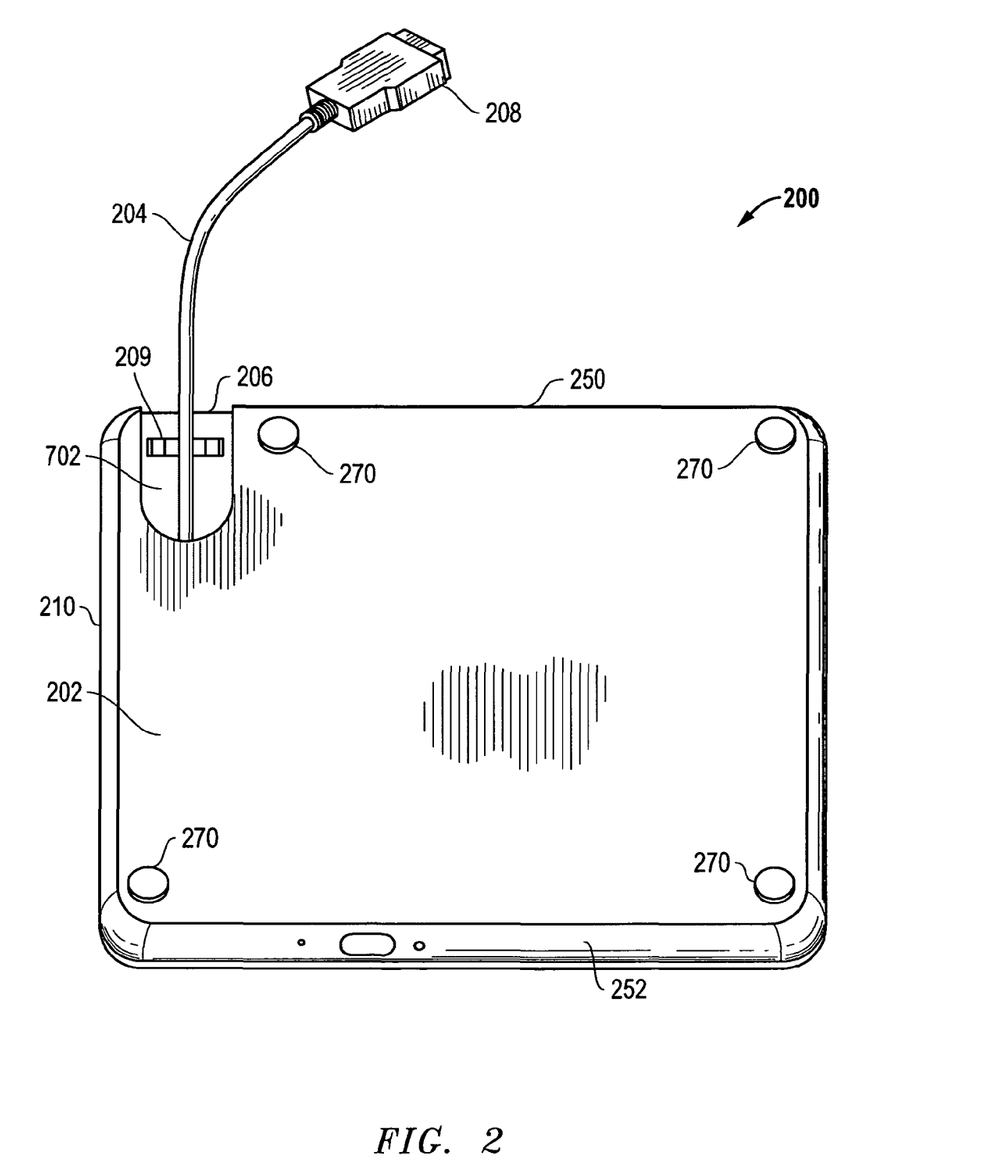
FIG. 2 is a perspective underside view of a portable ODD apparatus as it may be configured in one exemplary embodiment of the disclosed apparatus and methods.

FIG. 2 shows a perspective underside view of a portable optical disk drive (ODD) apparatus 200 as it may be configured in one exemplary embodiment of the disclosed apparatus and methods. In one exemplary embodiment, ODD apparatus 200 may be an ODD apparatus that meets the Small Form Factor Committee "SFF-8552 Specification for Form Factor of 5¼", 9.5 mm and 12.7 mm Height Optical Drives" (Rev. 1.3) Jan. 18, 2006, which is incorporated herein by reference. In one such embodiment, the disclosed portable ODD 200 may have external dimensions that are identical to the external dimensions of a conventional SFF-8552 compliant ODD. However, any other configuration of ODD apparatus 200 having an inner chassis with a disk receiving section that is configured to receive the optical disk media and that extends beyond the outer boundary of (i.e., overhangs or is cantilevered relative to) an electronics section of the inner chassis that contains electronic components of the ODD so as to form a cut-out section that defines an internal cavity between the inner ODD chassis and the inside of an outer ODD enclosure when these components are assembled together.

As shown in FIG. 2, the bottom surface 202 of bottom component 210 of the outer enclosure of portable ODD apparatus 200 has a cable access cavity 206 defined therein adjacent the back side 250 of ODD apparatus 200 having a cable access opening 704 (shown in other Figures) through which a retractable connection cable 204 extends outward from an internal cavity within ODD apparatus 200 as shown. An optional connector support shelf 702 may be provided integral to bottom component 210 adjacent cable access cavity 206 as shown. An optional cable retention feature 209 (e.g., plastic snap fit bracket with opposing expandable retention arms or any other suitable retaining feature structure) may be provided as shown to receive and engage the outer dimensions of connector 208 to secure connector 208 within cable access cavity 206 during storage and/or travel. In this exemplary embodiment cable retention feature 209 extends from connector support shelf 702, although any other suitable configuration is possible. A connector 208 (e.g., USB connector, eSATA connector, etc.) may be provided as shown on the terminal end of cable 204, and cable access cavity 206 may be dimensioned to receive and at least partially or substantially completely contain the terminal end of the retracted connection cable 204 (e.g., along with its associated connector 208) within the outer dimensions of bottom component 210 of the outer enclosure while at the same time providing access to the terminal end and/or connector of connection cable 204 so that a user may pull the connector cable 204 out from the internal cavity of the outer enclosure of ODD 200.

In the extended condition of FIG. 2, connection cable 204 is ready for connection to a portable or non-portable information handling system (e.g., laptop or notebook computer, netbook, desktop computer, etc.). A user may so extend connection cable by grabbing the terminal end or connector 208 of connection cable 204 and pulling the connection cable 204 from the internal cavity of the outer enclosure of ODD 200. A disk insertion opening and control features (e.g., such as ejection button) may be provided on the front side 252 of ODD apparatus 200. Optional mounting feet (e.g., rubberized mounting feet) 270 may be provided as shown on the bottom surface 202 of outer enclosure of portable ODD apparatus 200.

It will be understood that the particular number configuration and identity of disk insertion opening and control features may vary in different embodiments. Further, although a particular configuration of cable access cavity 206 with cable access opening 704 is shown defined in a bottom component 210 of the outer enclosure of portable ODD apparatus 200 adjacent the back side 250 of ODD apparatus 200, it will be understood that a cable access opening (with or without a cable access cavity) may be defined in any other size, shape and/or location (e.g., adjacent front side of a portable ODD, and/or in a bottom and/or top component of the outer enclosure of a portable ODD) that is suitable for accommodating retraction and extension of a connection cable 204 and associated connector 208 from a cavity defined within the outer enclosure of the portable ODD. Further, it is also possible that at least one (e.g., a single) outer enclosure component may be employed and configured such that it at least partially surrounds or encloses an ODD inner chassis in a manner that creates an internal cavity between a cut-out section of the inner chassis and the inside of the at least one outer ODD enclosure when the outer ODD enclosure and inner chassis components are assembled together.

Figure 3:
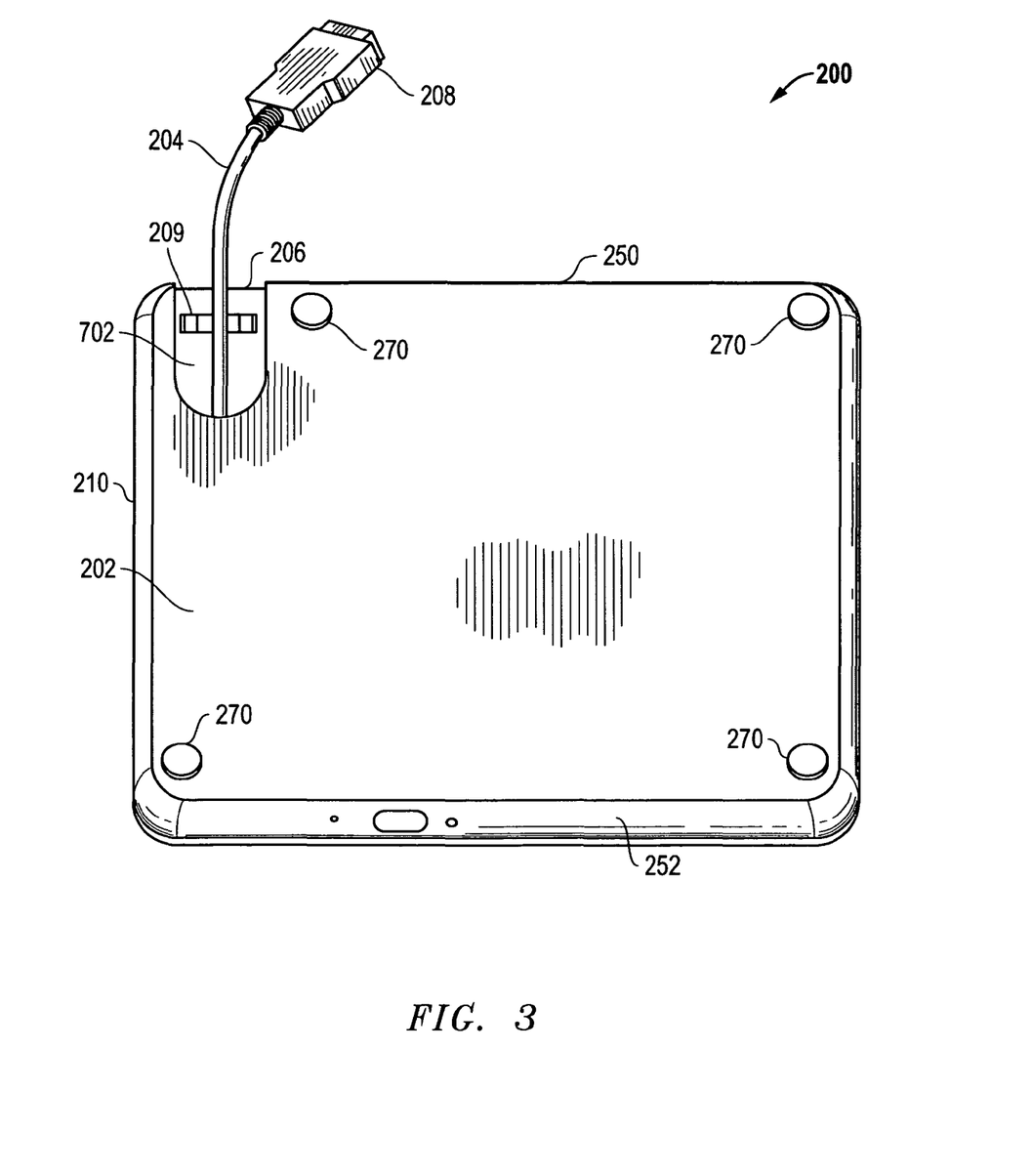
FIG. 3 is a perspective underside view of a portable ODD apparatus as it may be configured in one exemplary embodiment of the disclosed apparatus and methods.
Figure 4:
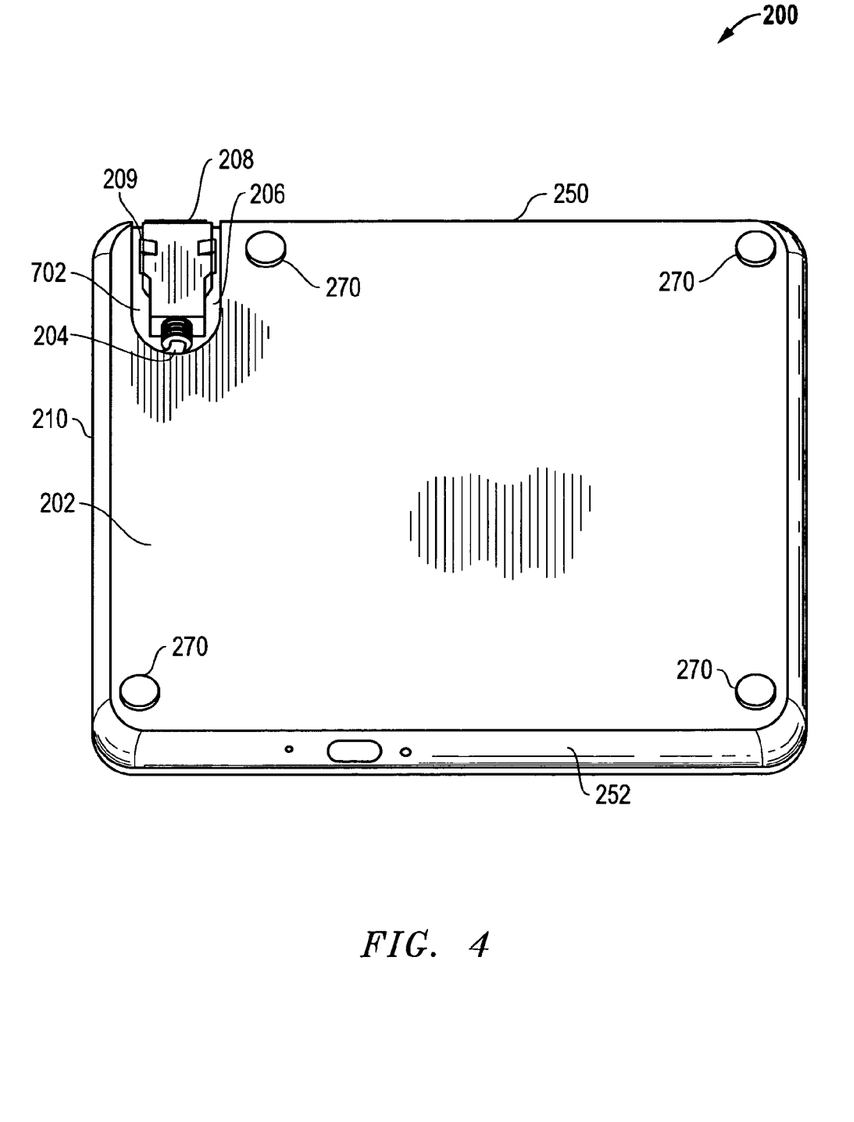
FIG. 4 is a perspective underside view of a portable ODD apparatus as it may be configured in one exemplary embodiment of the disclosed apparatus and methods.

FIG. 3 shows the portable ODD apparatus 200 with connection cable 204 partially retracted into an internal cavity of the ODD apparatus 200, e.g., by the action of a user's hand to push the connection cable 204 through cable access opening 704 into the internal cavity. FIG. 4 shows the portable ODD apparatus 200 with connection cable 204 completely retracted and stored within the internal cavity ODD apparatus 200, with connector 208 received and at least partially contained within cable access cavity 206. An optional cable retention feature 209 (e.g., plastic snap fit bracket with opposing expandable retention arms or any other suitable retaining feature structure) may be provided as shown to receive and engage the outer dimensions of connector 208 to secure connector 208 within cable access cavity 206 during storage and/or travel. In the retracted condition of FIG. 4, connection cable 204 is ready for travel and/or storage by a user when not connected to an information handling system. In one exemplary embodiment, connection cable 204 and connector 208 may be completely contained in storage position within the outer dimensions of the outer enclosure of ODD apparatus 200 such that the outer dimensions of the ODD apparatus 200 with the connection cable 204 contained therein is the same as (and no larger than) the outer dimensions of the outer enclosure itself, e.g., such as the outer dimensions of the outer enclosure of a SFF-8552 ODD drive.

Figure 5A:
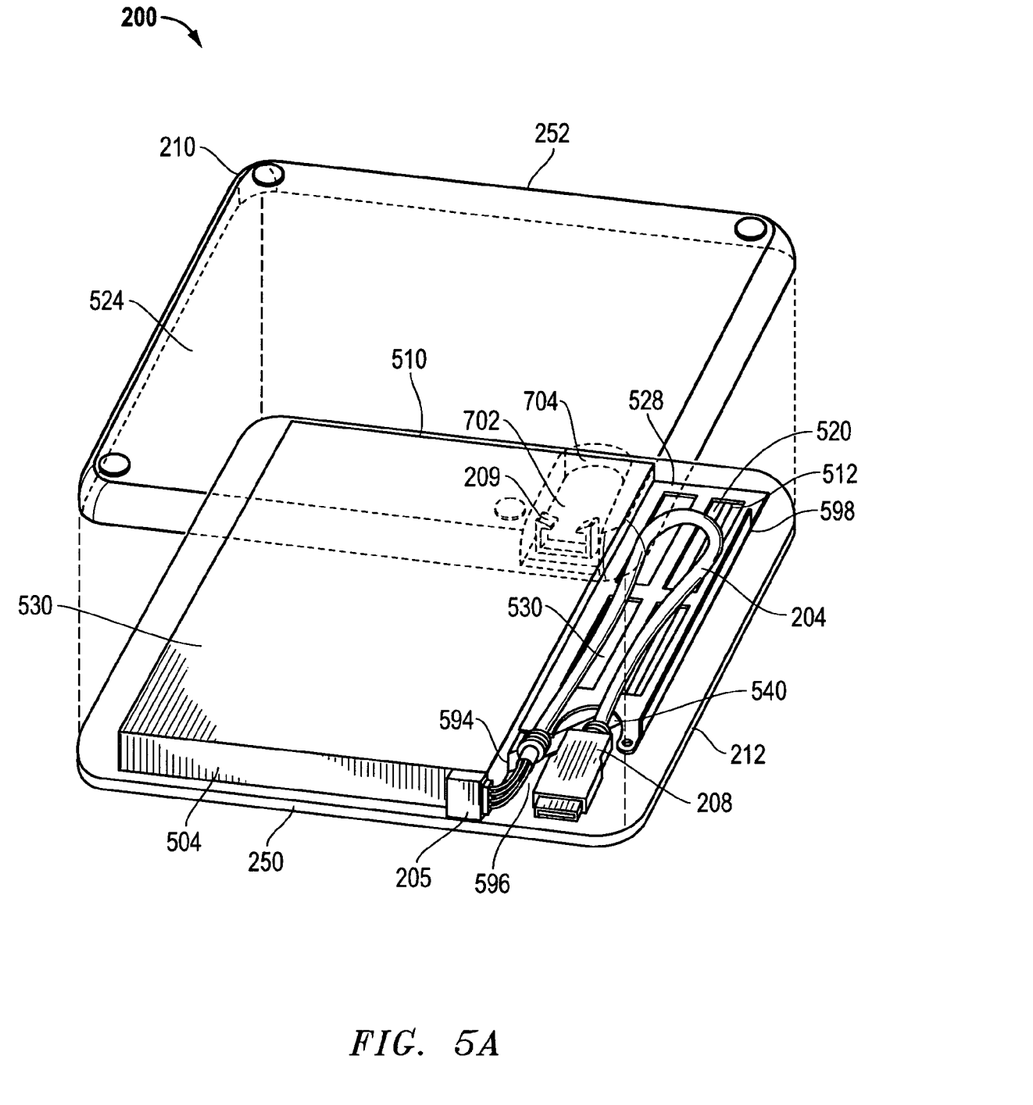
FIG. 5A is a perspective back side view of the underside of a portable ODD apparatus as it may be configured in one exemplary embodiment of the disclosed apparatus and methods.

FIG. 5A is a perspective back side view of the inner chassis underside 530 of portable ODD apparatus 200 with bottom component 210 of the outer enclosure of ODD apparatus 200 shown in partial dashed (hidden) outline, and with top component 212 of the outer enclosure in place. As may be seen in FIG. 5A, ODD apparatus 200 has an inner chassis 524 that includes an electronics section 510 that contains electronic components (e.g., including motor) of the drive, and a disk receiving section 512 that includes a bay internally configured for receiving outer dimensions of an optical disk. FIG. 5A also shows optional connector support shelf 702 as it may be provided integral to bottom component 210 adjacent cable access opening 704 as shown. Cable access opening 704 extends from the outside to inside of bottom component 210 so as to provide an insertion point through which connection cable 204 and its connector 208 may be inserted when bottom component 210 is assembled to top component 212 around inner chassis 524.

As shown in FIG. 5A, disk receiving section 512 extends outward from and beyond the outer periphery of one side of electronics section 510 so as to form a cut-out section 520 of reduced thickness in the underside 530 of inner chassis 524. Disk receiving section 512 extends backwards from front surface 528 of inner chassis toward back surface 504 of inner chassis 524, and terminates with a backwardly angled profile section 540 as shown between the front surface 528 and back surface 504 of inner chassis 524. The inner chassis 524 of ODD 200 is configured to be received between lower drive enclosure component 210 and upper drive enclosure component 212 that are placed to surround the inner chassis 524 during normal drive operations. When so assembled, a cavity is formed by the cut-out section 520 between the inside of lower drive enclosure component 524 and the underside 530 of inner chassis 524 where disk receiving section 512 extends beyond the outer boundary of (i.e., overhangs or is cantilevered relative to) electronics section 510 of ODD 200, and a space 596 is formed between the termination point 594 of backwardly angled profile section 540 and the inner surface of lower drive enclosure components 210.

It will be understood that the particular illustrated configuration of disk receiving section 512 and electronics section 510 of ODD 200 is exemplary only, e.g., backwardly angled profile section 540 need not be present as long as the disk receiving section extends beyond the outer boundary of (i.e., overhangs or is cantilevered relative to) an electronics section of the inner chassis of an ODD in a manner that creates a cut-out section that forms a cavity of sufficient space to contain a connection cable that is substantially full retracted therewithin. Furthermore, it will be understood that a cut-out section may be defined on any side of an ODD by a disk receiving section that extends beyond the outer boundary of a corresponding electronics section of the ODD. In this regard, the disk receiving section of an ODD inner chassis may be positioned adjacent the underside of an ODD with an electronics section thereabove such that a cut-out section is defined in the upper side of an ODD inner chassis so as to form a cavity between the inside of an upper ODD drive enclosure component and the upper side of the ODD inner chassis that is of sufficient dimension to contain a connection cable on the upper side rather than the underside of the inner chassis of an ODD.

Still referring to FIG. 5A, connection cable 204 is shown in retracted and stored position within the internal cavity of ODD apparatus 200 formed by cut-out section 520 between the inside of bottom component 210 of the outer enclosure and the underside 530 of inner chassis 524. Connection cable 204 is electrically coupled to internal electronics of inner chassis 524 at a connection point (e.g., cable interconnect) 205 as shown. In this exemplary embodiment, connector 208 is at least partially received and stowed in the space 596 that is formed between the termination point 594 of backwardly angled profile section 540 and the inner surface of lower drive enclosure components 210, as shown. Also illustrated in FIG. 5A is optional cable retention support 598 that is configured in this exemplary embodiment as a shelf-like structure that is coupled (e.g., using screws or other suitable mechanical connector) to inner chassis 524 and extends outward over and adjacent to disk receiving section 512 and cut-out section 520 as shown in a configuration that acts to support and contain connection cable 204 when it is retracted and stored position within the internal cavity of ODD apparatus 200. A lip may be provided on the outward edge of cable retention support 598 to contain connection cable 204 within the support area of cable retention support 598.

Figure 5B:
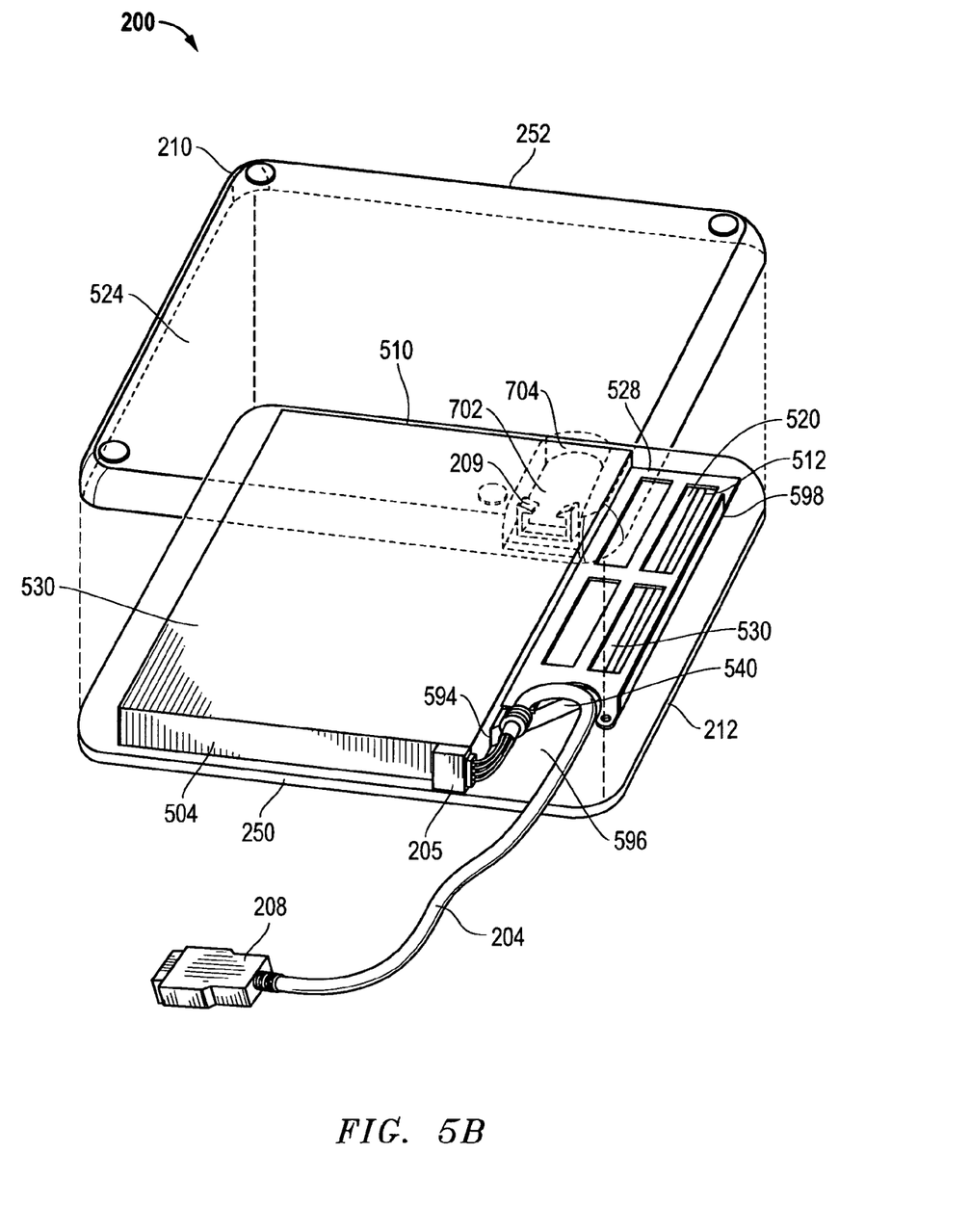
FIG. 5B is a perspective back side view of the underside of a portable ODD apparatus as it may be configured in one exemplary embodiment of the disclosed apparatus and methods.

FIG. 5B is a perspective back side view similar to FIG. 5A, but showing connection cable 204 in extended condition and ready for connection to a portable or non-portable information handling system. It will be understood that the illustrated configuration and location of connection point 205 is exemplary only, and that a connection cable may be electrically coupled to internal electronics of an ODD inner chassis at any suitable connection point, e.g., within the outer enclosure of the ODD.

Figure 6:
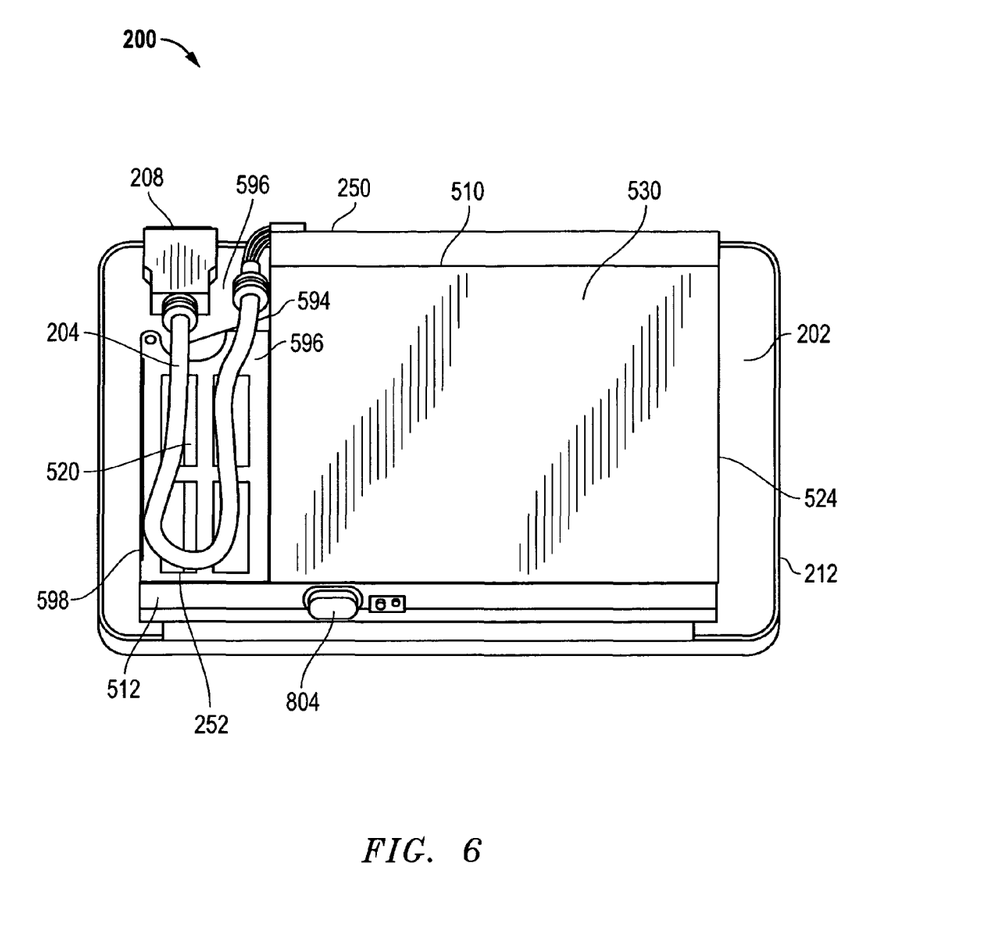
FIG. 6 is a front side perspective view of the underside of a portable ODD apparatus with removed bottom component of the outer enclosure as it may be configured in one exemplary embodiment of the disclosed apparatus and methods.
Figure 7:
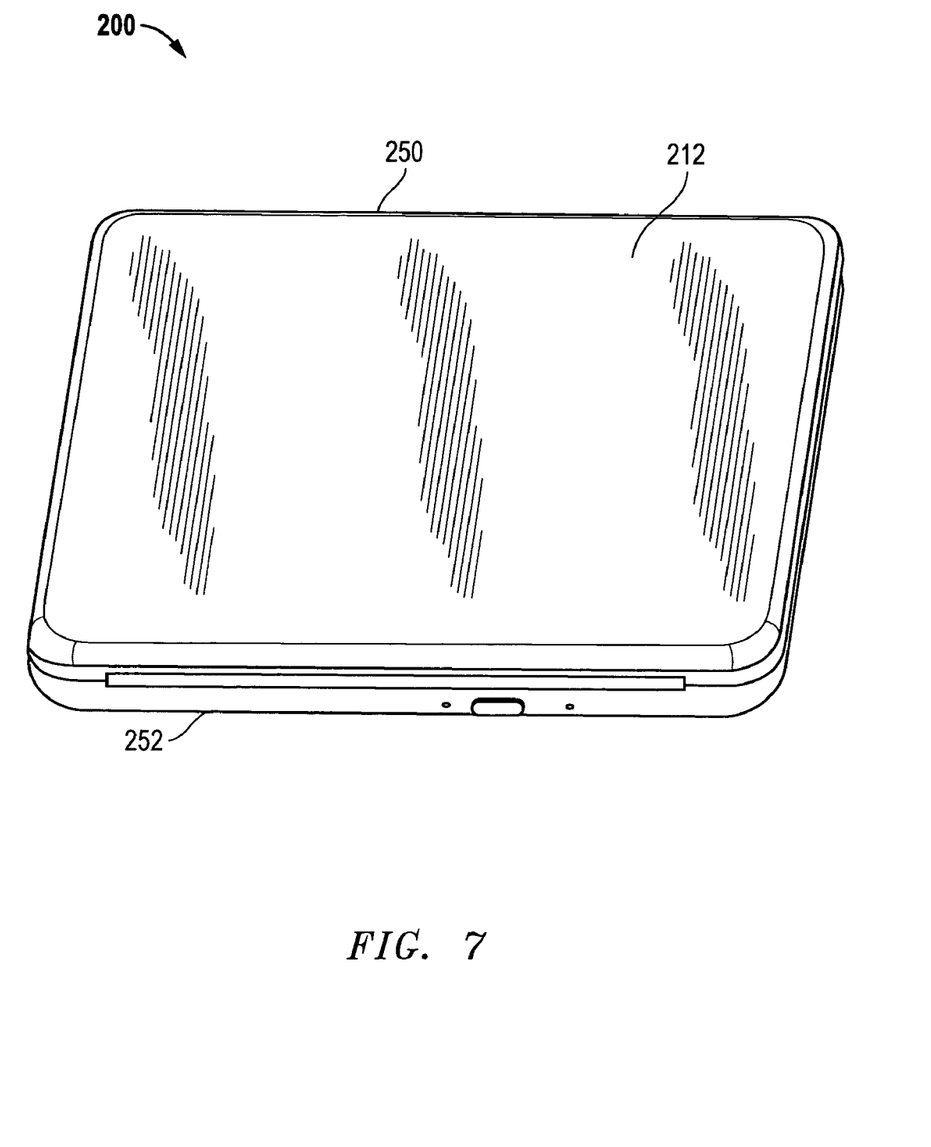
FIG. 7 is a front side perspective view of the top side of a portable ODD apparatus as it may be configured in one exemplary embodiment of the disclosed apparatus and methods.

FIG. 6 is a front side perspective view of the underside 530 of portable ODD apparatus 200 with bottom component 210 of the outer enclosure of ODD apparatus 200 removed, and connection cable 204 in retracted and stored position. FIG. 7 is front side perspective view of the top side of ODD 200 device with top component 212 of the outer enclosure in place, and with the connection cable 204 shown in retracted and stored position. In this embodiment, top surface 203 of top component 212 of the ODD apparatus outer enclosure is substantially solid and planar.

Figure 8:
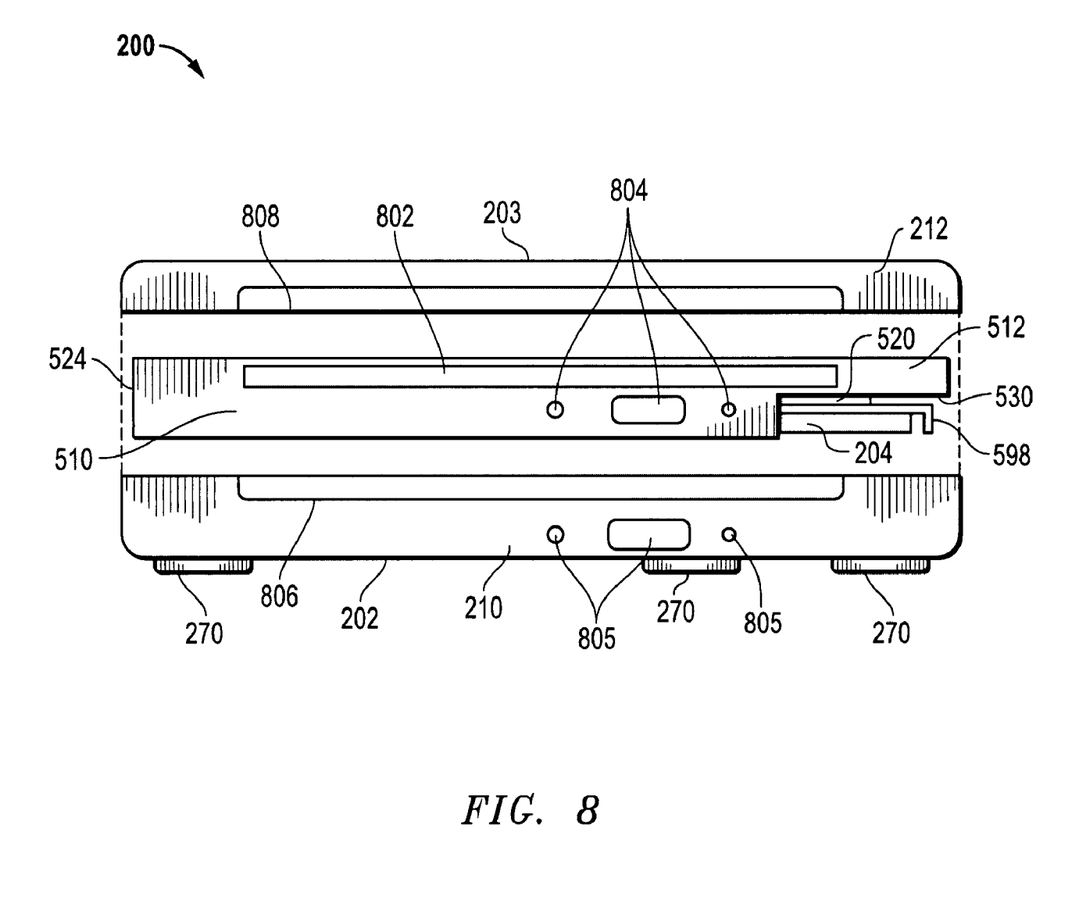
FIG. 8 is a front side exploded view of a portable ODD apparatus as it may be configured in one exemplary embodiment of the disclosed apparatus and methods.

FIG. 8 shows a front side exploded view of portable ODD apparatus 200, with disk insertion slot 802 defined in the front side of disk receiving section 512 of inner chassis 524. FIG. 8 also shows corresponding mating disk insertion recesses 808 and 806 that are defined in edges of respective top component 212 and bottom component 210 of the outer enclosure of ODD apparatus 200 to allow clearance for insertion and removal of optical disks from disk receiving section 512 of inner chassis 524. Also shown are control and indicator components 804 (e.g., eject button, drive activity light, emergency disk removal slot) of electronics section 510 of inner chassis 524. Interface components 805 are also shown provided in corresponding to control and indicator components 804 of bottom component 210 of the outer enclosure of ODD apparatus 200.

Figure 9:
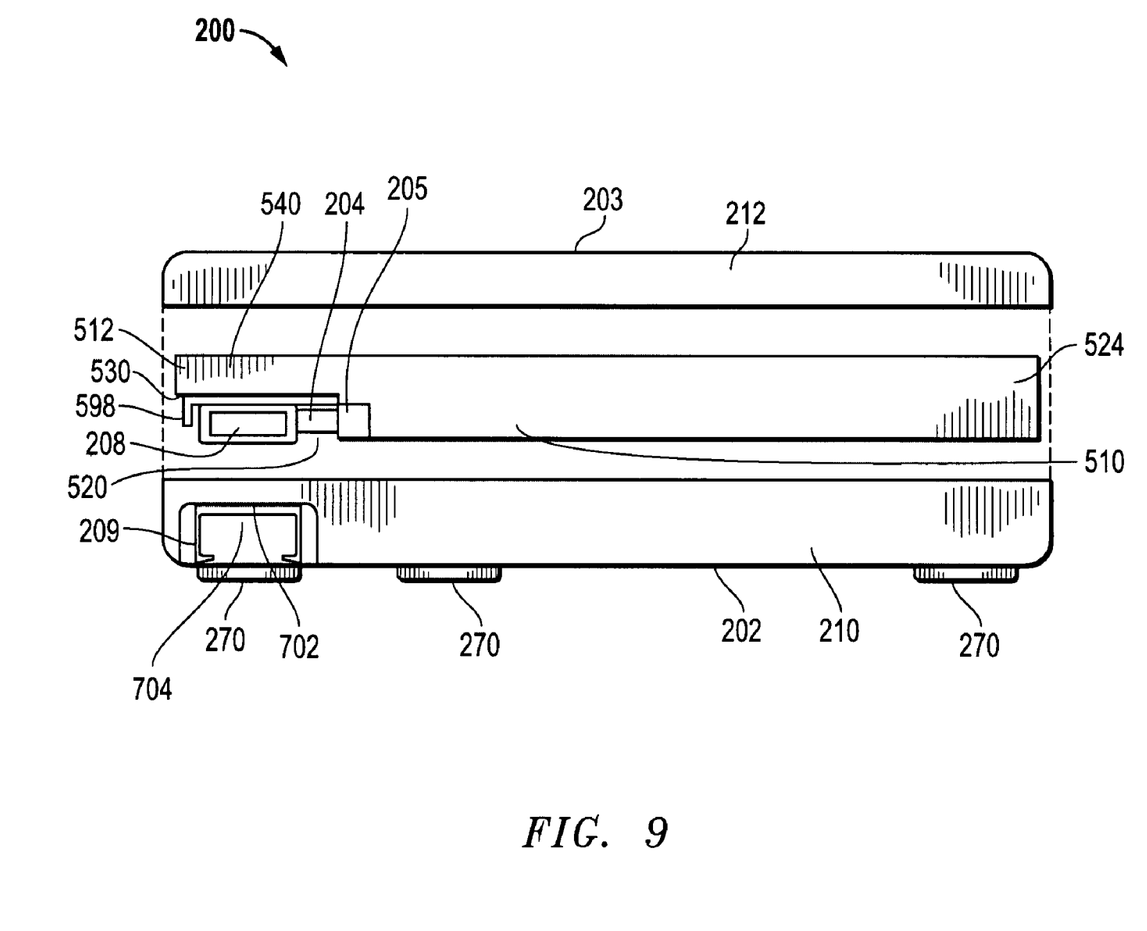
FIG. 9 is a back side exploded view of a portable ODD apparatus as it may be configured in one exemplary embodiment of the disclosed apparatus and methods.
Figure 10:
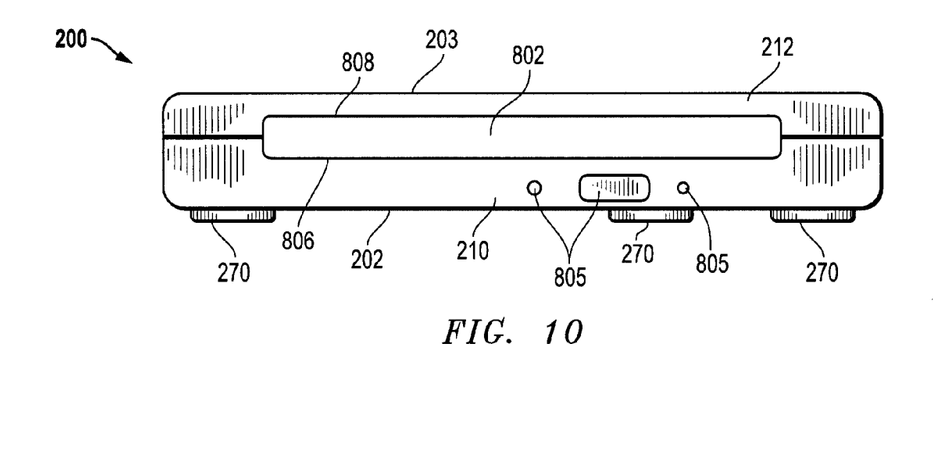
FIG. 10 is a front side assembled view of a portable ODD apparatus as it may be configured in one exemplary embodiment of the disclosed apparatus and methods.

FIG. 9 shows a back side exploded view of portable ODD apparatus 200, with cable access cavity 206 defined in the back side of the bottom component 210 of the outer enclosure of ODD apparatus 200. FIG. 10 shows an assembled front side view of portable ODD apparatus 200, with mating disk insertion recesses 808 and 806 assembled around disk insertion slot 802.

Figure 11:
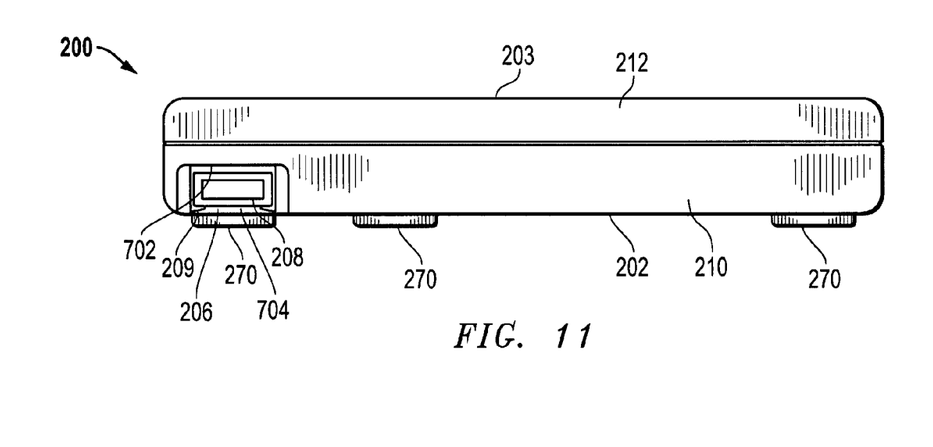
FIG. 11 is a back side assembled view of a portable ODD apparatus as it may be configured in one exemplary embodiment of the disclosed apparatus and methods.

FIG. 11 shows an assembled back side view of portable ODD apparatus 200, with cable access cavity 206 defined in the back side of the bottom component 210 of the outer enclosure of ODD apparatus 200. In FIG. 11, connection cable 204 is completely retracted and stored within the internal cavity of ODD apparatus 200, with connector 208 received within cable access cavity 206 and retained by cable retention feature 209 as shown.

Figure 12:
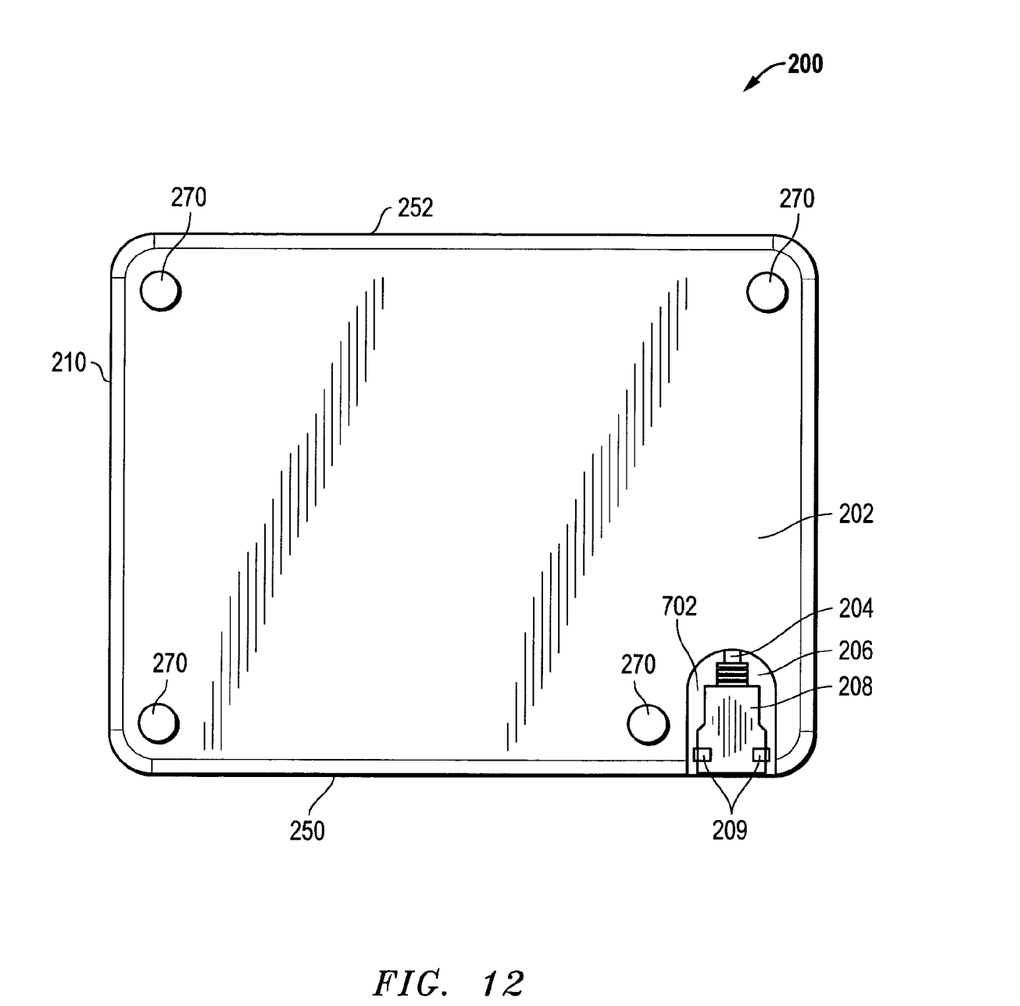
FIG. 12 is a bottom side assembled view of a portable ODD apparatus as it may be configured in one exemplary embodiment of the disclosed apparatus and methods.

FIG. 12 shows an assembled bottom side view of portable ODD apparatus 200, with cable access cavity 206 with connection cable 204 completely retracted and stored within the internal cavity of ODD apparatus 200, with connector 208 received within cable access cavity 206 and retained by cable retention feature 209 as shown.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. A portable optical disk drive (ODD) apparatus, comprising:
    an inner chassis having a disk receiving section having a bay defined therein that is internally configured for receiving outer dimensions of an optical disk media and an electronics section containing electronic components, the disk receiving section being contiguous with and extending beyond the outer boundary of the electronics section in a cantilevered manner relative to the electronics section to form a cut-out section between the electronics section and the disk receiving section of the inner chassis, and the bay and electronics components being contained and enclosed together within the inner chassis;
    at least one outer enclosure component coupled to at least partially surround the inner chassis such that an internal cavity is defined by the cut-out section outside of the inner chassis and between the inner chassis and the inside of the outer enclosure component; and
    a connection cable disposed outside the inner chassis and having terminal and proximal ends, the proximal end of the connection cable being electrically coupled within the internal cavity to one or more electronic components disposed within the inner chassis;
    wherein a cable access opening is defined in the outer enclosure component contiguous with the internal cavity;
    wherein the connection cable is selectably positionable between a retracted position where the connection cable is substantially contained within the internal cavity outside the inner chassis in the cut-out section between the electronics section and the disk receiving section of the inner chassis, and an extended position where the connection cable is at least partially extended from the cavity through the cable access opening to a position outside the outer enclosure component.

2. The apparatus of claim 1, wherein the at least one outer enclosure component comprises a top outer enclosure component and a bottom outer enclosure component coupled around the inner chassis; and wherein the cable access opening is defined in the bottom outer enclosure component.

3. The apparatus of claim 1, further comprising cable retention support coupled to the inner chassis to extend outward adjacent the disk receiving section and the cut-out section such that it supports and contains the connection cable when it is positioned in the retracted position.

4. The apparatus of claim 1, further comprising a connector provided on the terminal end of the connection cable; and wherein the connector is configured for temporary connection to a mating connector of an information handling system to transfer data between the portable ODD apparatus and an information handling system, and to transfer power to the portable ODD apparatus from the information handling system.

5. The apparatus of claim 4, further comprising a cable access cavity defined in the outer enclosure component adjacent the cable access opening, the cable access cavity being configured to provide external access to the connection cable while substantially completely containing the connector of the connection cable within the outer dimensions of the bottom component of the outer enclosure when the connection cable is positioned in the retracted position.

6. The apparatus of claim 4, further comprising a cable retention feature coupled to at least one outer enclosure component in a position adjacent the cable access opening, the cable retention feature being configured to receive and secureably engage the outer dimensions of the connector so as to secure the connector in position within the cable access cavity and to secure the connection cable in retracted position within the internal cavity.

7. The apparatus of claim 4, wherein the connector is a universal serial bus (USB) connector or external serial ATA (eSATA) connector.

8. The apparatus of claim 1, wherein the disk receiving section of the inner chassis has an opening defined in a front surface thereof for receiving an optical disk, the front surface of the inner chassis being disposed adjacent an inner surface of a front side of the outer enclosure of the portable ODD apparatus; wherein the disk receiving section extends backwards from the front surface of the inner chassis toward a back surface of the inner chassis structure to terminate with a backwardly angled profile section at a termination point between the front and back surfaces of the inner chassis structure, the back surface of the inner chassis being disposed adjacent a back side of the outer enclosure of the portable ODD apparatus so as to define a space between the termination point of the backwardly angled profile section and an inner surface of the back side of the outer enclosure component; and wherein the connector is at least partially received in the space defined between the termination point of the backwardly angle profile section and the inner surface of the back side of the outer enclosure of the portable ODD apparatus when the connection cable is positioned in retracted position.

9. The apparatus of claim 1, wherein the components of the ODD apparatus are configured to contain and store the connection cable completely within the outer dimensions of the ODD, and wherein the components of the ODD also meet the Small Form Factor Committee "SFF-8552 Specification for Form Factor of 5¼", 9.5 mm and 12.7 mm Height Optical Drives."

10. A method of managing a connection cable of a portable optical disk drive (ODD) apparatus, the method comprising:
providing a portable ODD apparatus that comprises:
an inner chassis having a disk receiving section having a bay defined therein that is internally configured for receiving outer dimensions of an optical disk media and an electronics section containing electronic components, the disk receiving section being contiguous with and extending beyond the outer boundary of the electronics section in a cantilevered manner relative to the electronics section to form a cut-out section between the electronics section and the disk receiving section of the inner chassis, and the bay and electronics components being contained and enclosed together within the inner chassis,
at least one outer enclosure component coupled to at least partially surround the inner chassis such that an internal cavity is defined by the cut-out section outside of the inner chassis and between the inner chassis and the inside of the outer enclosure component, and
a connection cable disposed outside the inner chassis and having terminal and proximal ends, the proximal end of the connection cable being electrically coupled within the internal cavity to one or more electronic components of the disposed within the inner chassis,
wherein a cable access opening is defined in the outer enclosure component contiguous with the internal cavity; and
selectably positioning the connection cable between a retracted position where the connection cable is substantially contained within the internal cavity outside the inner chassis in the cut-out section between the electronics section and the disk receiving section of the inner chassis, and an extended position where the connection cable is at least partially extended from the cavity through the cable access opening to a position outside the outer enclosure component.

11. The method of claim 10, wherein the at least one outer enclosure component of the portable ODD apparatus comprises a top outer enclosure component and a bottom outer enclosure component coupled around the inner chassis; and wherein the cable access opening of the portable ODD apparatus is defined in the bottom outer enclosure component.

12. The method of claim 10, wherein the portable ODD apparatus further comprises a cable retention support coupled to the inner chassis to extend outward adjacent the disk receiving section and the cut-out section such that it supports and contains the connection cable when it is positioned in the retracted position.

13. The method of claim 10, wherein the portable ODD apparatus further comprises a connector provided on the terminal end of the connection cable; and wherein a cable access cavity is defined in the at least one outer enclosure component adjacent the cable access opening, the cable access cavity being configured to provide external access to the connection cable while substantially completely containing the connector of the connection cable within the outer dimensions of the bottom component of the outer enclosure when the connection cable is positioned in the retracted position.

14. The method of claim 13, further comprising:
first positioning the connection cable in the retracted position such that the connector is at least partially contained in the cable access cavity of the portable ODD apparatus; and then positioning the connection cable in the extended position;

then interconnecting the connection of the portable ODD apparatus to a mating connector of an information handling system; and then transferring data across the connection cable between the portable ODD apparatus and the information handling system, and transferring power across the connection cable to the portable ODD apparatus from the information handling system.

15. The method of claim 13, wherein the portable ODD apparatus further comprises a cable retention feature coupled to at least one outer enclosure component in a position adjacent the cable access opening; and wherein the method further comprises positioning the connector such that it is received and secureably engaged by the cable retention feature to secure the connector in the cable access cavity of the portable ODD apparatus and to secure the connection cable in retracted position within the internal cavity of the portable ODD apparatus.

16. The method of claim 13, wherein the connector is a universal serial bus (USB) connector or external serial ATA (eSATA) connector.

17. The method of claim 10, wherein the disk receiving section of the inner chassis of the portable ODD apparatus has an opening defined in a front surface thereof for receiving an optical disk, the front surface of the inner chassis being disposed adjacent an inner surface of a front side of the outer enclosure of the portable ODD apparatus; wherein the disk receiving section of the inner chassis of the portable ODD apparatus extends backwards from the front surface of the inner chassis toward a back surface of the inner chassis structure to terminate with a backwardly angled profile section at a termination point between the front and back surfaces of the inner chassis structure, the back surface of the inner chassis being disposed adjacent a back side of the outer enclosure of the portable ODD apparatus so as to define a space between the termination point of the backwardly angled profile section and an inner surface of the back side of the outer enclosure component; and wherein the method further comprises positioning the connection cable in the retracted position such that the connector is at least partially received in the space defined between the termination point of the backwardly angle profile section and the inner surface of the back side of the outer enclosure of the portable ODD apparatus.

18. The method of claim 10, wherein the method further comprises containing and storing the connection cable completely within the outer dimensions of the ODD; and wherein the components of the ODD apparatus are configured to meet the Small Form Factor Committee "SFF-8552 Specification for Form Factor of 5¼", 9.5 mm and 12.7 mm Height Optical Drives."

19. The apparatus of claim 1, further comprising a connector provided on the terminal end of the connection cable; wherein the connector is configured for temporary connection to a mating connector of a separate information handling system to transfer data between the external portable ODD apparatus and the information handling system, and to provide power to the external portable ODD apparatus from the information handling system; and wherein the separate information handling system comprises a laptop computer, notebook computer, netbook computer, or desktop computer that is a separate system from the portable ODD apparatus.

20. The apparatus of claim 1, where the outer enclosure component is configured to substantially contain components that consist essentially of the inner chassis, the connection cable, and a connector provided on the terminal end of the connection cable when the connection cable is selectably positioned in the retracted position.

21. The apparatus of claim 1, where the inner chassis completely surrounds and encloses the the bay and electronics components.

22. The method of claim 10, wherein the portable ODD apparatus further comprises a connector provided on the terminal end of the connection cable; and where the method further comprises:

temporarily connecting the connector to a mating connector of a separate information handling system; and then transferring data across the connection cable between the external portable ODD apparatus and the information handling system, and providing power to the external portable ODD apparatus from the information handling system;

where the separate information handling system comprises a laptop computer, notebook computer, netbook computer, or desktop computer that is a separate system from the portable ODD apparatus.

23. The method of claim 10, further comprising positioning the connection cable in the retracted position such that the outer enclosure component substantially contains components that consist essentially of the inner chassis, the connection cable, and a connector provided on the terminal end of the connection cable.

24. The method of claim 10, where the inner chassis completely surrounds and encloses the the bay and electronics components.

* * * * *